April 16, 1968     E. L. BAKER     3,377,900

FLYING SAW

Filed Feb. 9, 1966     4 Sheets-Sheet 1

FIG. 1

INVENTOR.
ELLERY L. BAKER
BY
*Barlow & Barlow*
ATTORNEYS

April 16, 1968 E. L. BAKER 3,377,900
FLYING SAW

Filed Feb. 9, 1966 4 Sheets-Sheet 3

INVENTOR.
ELLERY L. BAKER
BY
*Barlow & Barlow*
ATTORNEYS

April 16, 1968
E. L. BAKER
3,377,900
FLYING SAW
Filed Feb. 9, 1966
4 Sheets-Sheet 4
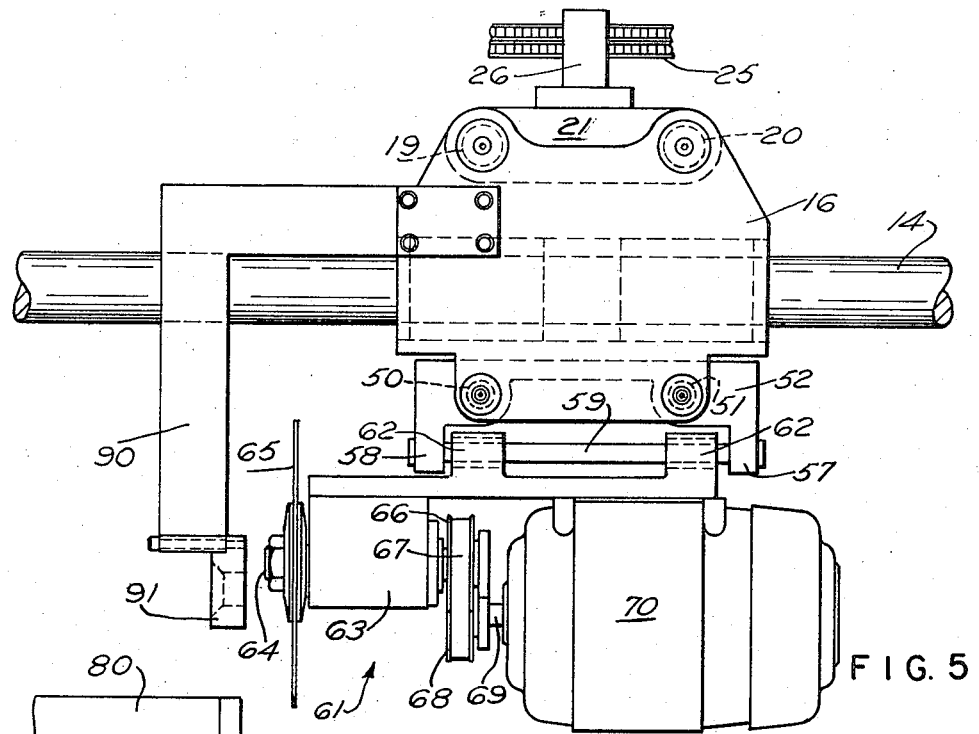
FIG. 5
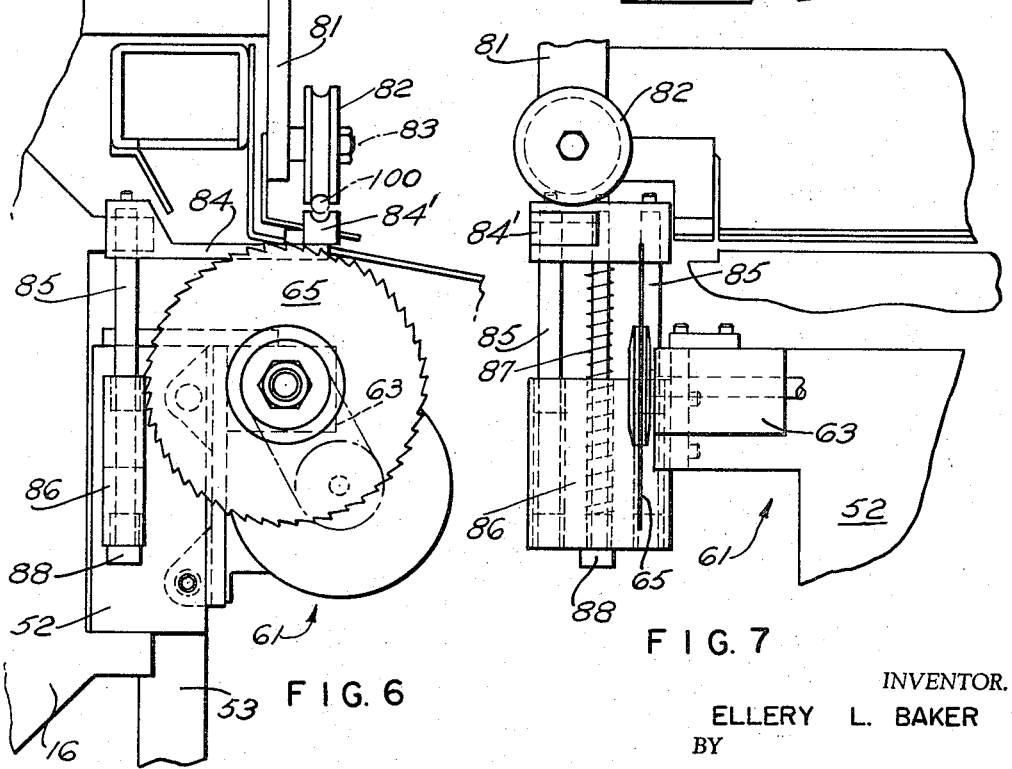
FIG. 6
FIG. 7
INVENTOR.
ELLERY L. BAKER
BY
*Barlow & Barlow*
ATTORNEYS

United States Patent Office 3,377,900
Patented Apr. 16, 1968

3,377,900
FLYING SAW
Ellery L. Baker, Warwick, R.I., assignor to United Wire & Supply Corporation, a corporation of Rhode Island
Filed Feb. 9, 1966, Ser. No. 526,102
4 Claims. (Cl. 83—311)

ABSTRACT OF THE DISCLOSURE

A flying saw is mounted on a carriage which is reciprocated along a straight line path by connection to an orbital chain which chain causes the reciprocating movement. The length of the chain determines the length of the piece cut and different length chains may be placed in operation. Mounted upon this carriage there is a saw which may be cammed into engagement with the work as the carriage advances with the work and at the same time there is provided a means whereby there may be adjustments for lengths which vary between the lengths of the chain links.

This invention relates to an apparatus for automatically severing a rapidly moving metal tube or rod while in motion and is often referred to as a flying saw.

Tubing exists in coils and straight lengths and before being used is generally passed through straightening rolls and may then be severed into pieces having a desired length. The machine of this invention may be connected with a roll straightening machine which is the subject of my pending application Ser. No. 517,221, filed Dec. 29, 1965, which mechanism is used herein as a feeding device to the apparatus of this invention and will therefore be synchronized therewith.

Orbital chains have heretofore been utilized for driving carriages upon which saw heads are mounted but in all instances the lengths of work which could be obtained was limited to an exact multiple of the length of the links of the chain. For instances, if the lengths of the links of the chain were a half an inch then lengths of chain only in multiples of half inch could be provided. The chain links could not be made infinitely small because they would not be strong enough. This invention provides for a means so that lengths of work within the length of a chain link may be obtained, this being accomplished by a variation of speeds of the work and saw carriage.

One of the objects of this invention is to provide a straight line reciprocating movement for the saw carriage back and forth upon one straight length of track.

Another object of the invention is to provide a chain drive for advancing the saw carriage and saw and provide in the construction of a connection between saw head and the carriage a means for permitting some movement to occur so that by relatively adjusting the speeds of the work and the saw carriage there may be provided a different length of work than could be obtained by varying the length of chain.

Another object of the invention is to provide an arrangement so that the saw carriage may be driven or advanced in time with the work even though the speed of the carriage for the saw may be somewhat different.

With these and other objects in view, the invention consists of certain novel features of construction as will be more fully described and particularly pointed out in the appended claims.

In the accompanying drawings:

FIG. 1 is a side elevation with the work guide omitted and partly broken away showing the saw of this invention;

FIG. 5 is a top plan view of a fragmental portion of the saw apparatus illustrating the work guide;

FIG. 6 is an end view of a modified form showing a mechanism for attaching the saw head to the work; and FIG. 7 is an end view of a part of the structure shown in FIG. 6.

Figure 2:
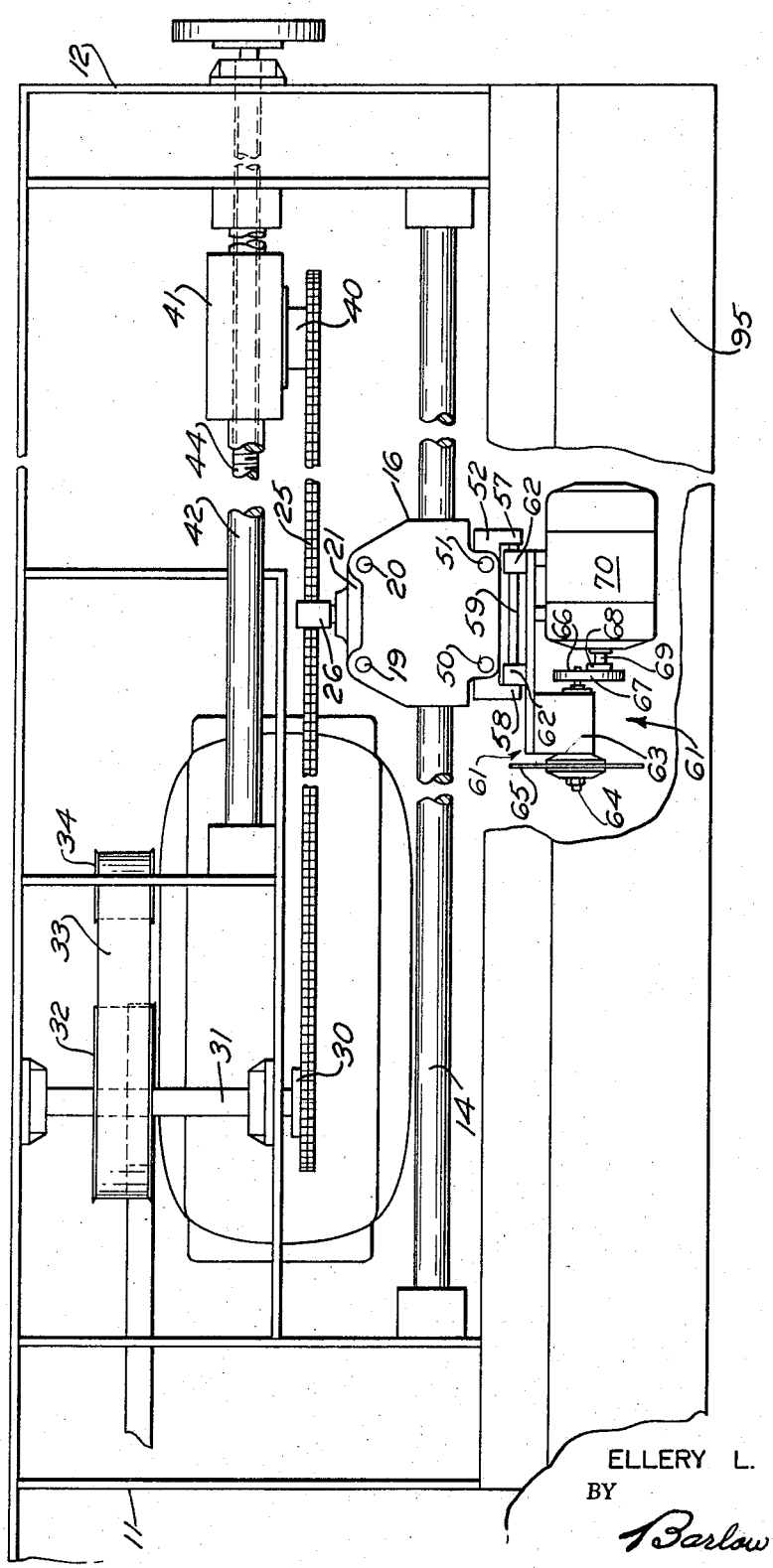
FIG. 2 is a top plan view thereof.

With reference to the drawings, there is a base 10 with uprights 11 at one end and 12 at the other end of the apparatus which support pairs of guide rods 14 and 15 upon which there is slidably mounted a carriage 16 carrying a work guide arm 90 with a work guide 91 (FIG. 5).

This carriage has upper arms 17 (FIG. 3) and lower arms 18 which support vertical rods 19 and 20 upon which a crosshead 21 is reciprocably slidably mounted.

A chain 25 moves in an orbital path shown by dot dash lines FIG. 1. The crosshead 21 (FIG. 2) is attached to chain 25 by a clamp 26 which may swivel with reference to the crosshead 21 and is secured to one of the links of the orbital chain 25 so that as the chain moves about its orbit the carriage 16 will be reciprocated in a straight path back and forth along the rods 14 and 15. As the attachment of this swivel mounting 26 moves from its upper path of travel to its lower path of travel, as shown by the dotted line in FIG. 3, the carriage will gradually slow down and then move in the opposite direction.

The orbital chain 25 is trained over a sprocket 30 driven by shaft 31 through pulley 32, belt 33 and pulley 34 on the end of drive shaft 35. The chain 25 is also trained over the adjustable sprocket 40 which is mounted by means of a carrier 41 on guides 42 permitting chains 25 of varied lengths to be positioned over the sprockets 30 and 40 and the chain tightened by movement of the sprocket 40. This movement may be accomplished such as by means of pulley 43 and screw 44 driven by belt 45 and air motor 46. The length of the chain will determine the length of the work piece to be cut, and as this chain is made up of links of at least a length of half inch, the lengths of the work determined by the length of the chain can only be varied in the amounts of multiples of the lengths of the link or multiples of one half inch. However, an additional compensation for varying a cut within the length of the links of the chain will be described hereinafter.

The saw carriage 16 is also provided with upper and lower arms 48 and 49 supporting a pair of vertically disposed rods 50 and 51 on the opposite sides of the slideways 14, 15 from rods 19 and 20 which rods 50, 51 slidably mount the member 52 (FIG. 3) which has a leg 53 extending downwardly therefrom and carries a roller 54 to engage the cam surface 55 on the base of the machine so as to lift the member 52 as the carriage advances with the work. This cam surface 55 is pivoted as at 56 (FIG. 4) so that when the roller 54 returns it will be lifted out of the way by the roller by pivoting upwardly as shown in FIG. 4 and will then drop back into position by gravity.

The member 52 is provided with a pair of horizontal arms 57 and 58 (FIG. 2) which support between them a pair of rods 59 extending generally in a horizontal direction. A saw head designated generally 61 has lugs 62 with openings to receive the rods 59 and slidably mount the saw head 61 on the rods 59 of member 52. The saw head 61 has a bearing 63 which is fixed thereto and supports the shaft 64 upon which shaft the saw 65 is fixedly mounted. The shaft 64 is driven by means of a pulley 66, belt 67 and pulley 68 from the armature shaft 69 of the motor 70 which is also mounted on the saw head.

Figure 3:
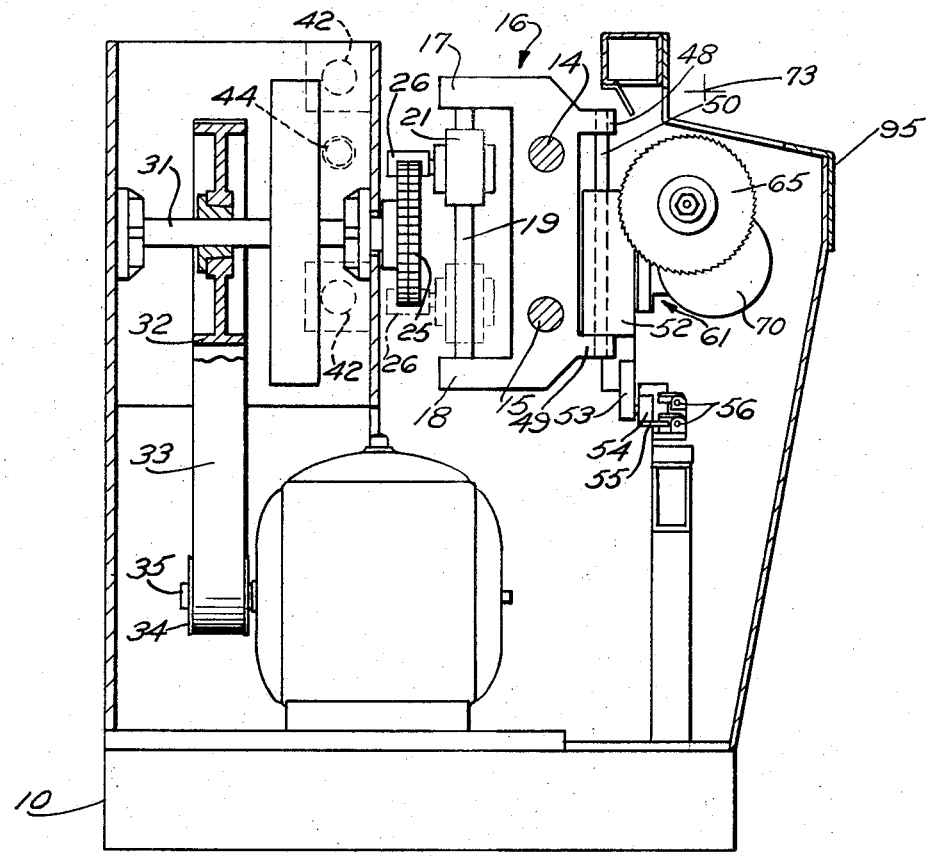
FIG. 3 is a sectional view through substantially at the chain drive shaft.
Figure 4:
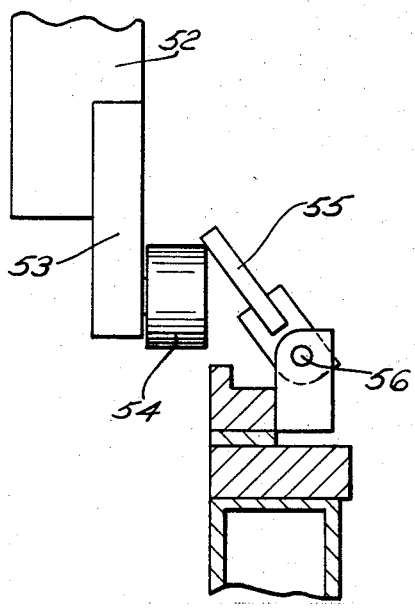
FIG. 4 is a detail showing the means for permitting the cam surface to be lifted out of the way as the saw turns.

The work will move in a straight line path, its axial center being shown in FIG. 3 at 73. It will be apparent that as the carriage is moved to the right as shown in FIGS. 1 and 2 of the drawing that the saw will be moved upwardly along rods 50, 51 into a position to engage the work by means of the roller 54 moving over the cam surface 55 and after it is passed the end of the cam surface 55 it then will drop permitting the member 52 to drop to the position shown in FIG. 1. In the operation of this apparatus where the length of work is the same as the length of chain, the chain 25 is set to advance at the same speed as the work is advanced, the work being advanced by means of a feeding device such as the straightening machine previously referred to, the speed of the chain 25 being varied by manual control 76 and belt 77, that in turn, through a variable speed transmission, controls the speed of shafts 31, 35. If the chain can be made to be of the length which it is desired the work shall be cut, such length chain will be installed in the apparatus; then the linear speed of the chain 25 will be set to move the saw at the same speed as the work is advanced and as the saw moves up the incline 55 it will engage the work traveling at the same speed and cause a severing operation to occur. The saw will then return to its initial starting position and as it is again moved up the incline another length of work which is the length of the chain 25 will be severed and so on automatically until the machine is stopped. However, if it is desired that the length of the work shall be slightly different than the length of the chain, say for instance a quarter of an inch where half inch links are used, then the work will be advanced at a speed so that in the length that is to be cut, the speed of the work will cause the work to travel one quarter inch further than the travel in one orbit of the length of the chain 25 which moves the saw. Thus, as the saw is raised by means of the cam 55, the blade will engage the work and by reason of the sliding movement which may occur by reason of the lugs 62 sliding on the rods 59, the saw may advance the additional fraction of an inch necessary to synchronize the speed of the saw blade with the speed of the tube during the time that it passes through the work. As soon as the severing is completed by the critical up and down movement of the saw head through the cam leg, the saw blade is disengaged from the tube and is free to move or pull in a lateral manner a distance equal to one pitch length of the orbit chain. The saw blade is returned to the proper start cut position on rods 59 against arm 58 on member 52 by means of acceleration of the saw carriage 16, as the chain clamp 26 passes around sprocket 30 and imparts motion to the saw carriage in the same direction as the tube.

The saw by engaging the tubing is ordinarily strong enough to slide the saw head along rods 59 and thus feed the saw head faster than the normal speed of travel of the chain 25, but in some cases it may be desired to provide an arrangement so that there is no strain placed upon the saw blade. In this case, as shown in FIGS. 6 and 7, a bracket 80 (FIG. 6) will extend out from the saw carriage 16 and an arm 81 will support a roller 82 upon a fixed axis 83. The saw head 52 will have a bearing block 86 fixed thereto in which there will be slidably mounted rods 85 which rods carry an arm 84 at the end of which is jaw 84' so located as to engage the work 100. A spring 87 acting between arm 84 and block 86 urges the arm upwardly against a stop 88. As the saw head 52 initially moves upwardly, the jaw 84' engages the work, presses it against roll 82, and binds the saw carriage to the work. Then, the continued further movement of the head 52 moves the block 86 upwardly along the rods 85 to move the saw into the work and sever it. By this arrangement the saw head is clamped to the work, and no strain is placed on the saw blade as the work advances a little faster than the saw, causing sliding movement of the saw head along the rods 59.

I claim:

1. In a machine for severing continuously moving tubes or the like into lengths, a sliding means generally parallel to the movement of the work including a carriage for reciprocal sliding movement therealong, a chain, means for moving the chain in an orbit whose plane is parallel to said sliding means, means attaching said carriage to said chain to reciprocate the carriage along said sliding means, a saw head and saw, means to slidably mount the saw head on the carriage for movement of the saw in a plane generally laterally to the movement of the sliding means and also mounts the head for movement in the direction of travel of the work, and a means to effect such lateral movement of the saw head as the carriage is moved by said chain.

2. In a machine as in claim 1 wherein there are means for driving the chain and means for advancing the work and these two means may be relatively adjusted to vary the cut lengths of work.

3. In a machine as in claim 1 wherein there are means to clamp the said head to the work.

4. In a machine as in claim 1 wherein there are means for driving the chain and means for advancing the work and these two means may be relatively adjusted as to speed to vary the cut lengths of work and means to clamp the said head to the work.

References Cited

UNITED STATES PATENTS

| 1,439,963 | 12/1922 | Kamper | 83—319 X |
| 2,019,465 | 10/1935 | Rubin | 83—319 X |
| 2,930,269 | 3/1960 | Kennedy | 83—318 X |
| 3,267,786 | 8/1966 | Kuts et al. | 83—318 |

FOREIGN PATENTS

| 724,973 | 1/1966 | Canada. |

JAMES M. MEISTER, *Primary Examiner.*